United States Patent Office 3,525,732
Patented Aug. 25, 1970

3,525,732
1:2 CHROMIUM COMPLEX DYESTUFFS CONTAINING A MONOAZO DYESTUFF AND DISAZO DYESTUFF
Fabio Beffa, Basel, and Guido Schetty, Aesch, Basel-Land, Switzerland, assignors to J. R. Geigy S.A., Basel, Switzerland
No Drawing. Filed May 1, 1967, Ser. No. 634,882
Claims priority, application Switzerland, May 6, 1966, 6,651/66
Int. Cl. C09b 45/06, 45/26, 62/02
U.S. Cl. 260—145          11 Claims

ABSTRACT OF THE DISCLOSURE

Heavy metal 1:2 complex dyestuffs containing a monoazo dyestuff moiety and a disazo dyestuff moiety bound in complex linkage to the heavy metal atom, preferably chromium, the disazo dyestuff moiety containing as middle component a naphthalene nucleus and as that terminal component which participates in complex formaton a 5- or 6-membered heterocyclic system G forming together with the azo bridge to which it is linked the atomic sequence

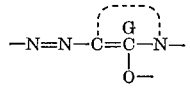

these new dyestuffs being useful for the dyeing of organic materials of most different kinds in brown, olive, blue, navy blue, or green to black shades; dyeings on wool, silk, leather, and synthetic polyamide fibres with those novel dyestuffs which contain water-solubilizing groups being particularly distinguished by good fastness properties; and those dyestuffs containing a fibre-reactive grouping being useful especially for the dyeing of cellulosic fibres, but also of polyamide fibres.

FIELD OF THE INVENTION

The present invention concerns new, heavy metal containing azo dyestuffs, a process for the production thereof, their use for the dyeing of organic materials, particularly for the dyeing of organic fibre materials containing polyamide and such organic materials dyed with these dyestuffs.

DESCRIPTION OF THE INVENTION

It has been found that valuable heavy metal containing dyestuffs are obtained by adding a dicyclic metallising azo dyestuff to a dicyclic metallised azo dyestuff which contains one co-ordinative hexavalent heavy metal atom per dyestuff molecule, these azo dyestuffs being so chosen that the reaction product contains a monoazo dyestuff and a disazo dyestuff bound in complex linkage to the heavy metal atom, whereby the disazo dyestuff contains, as middle component, a radical of the naphthalene series and, as the end component taking part in the complex formation, a 5- to 6-membered hetero ring system G forming together with the azo bridge to which it is linked the atomic sequence

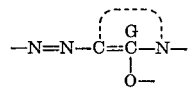

Both metallisable monoazo dyestuffs such as o,o'-dihydroxy-, o-alkoxy-o'-hydroxy, o-carboxy-o'-hydroxy- or o-hydroxy-o'-amino-monoazo dyestuffs as well as disazo dyestuffs of the type defined above having a naphthalene middle component which contains a metal complex forming group or one which can be converted into such a group under the metallising conditions, in a position adjacent to the azo bridge bound to the hetero cycle, can be used as dicyclic metallising azo dyestuffs in the sense of the definition.

The metallisable monoazo dyestuffs usable according to the invention are, e.g. coupling products of o-carboxy-, o-alkoxy-, o-hydroxy- or o-disulphonylamino- diazo compounds, principally of the benzene or naphthalene series, and coupling components coupling in a position adjacent to a hydroxyl or amino group. The monoazo dyestuffs can contain other substituents, e.g. halogens, cyano, nitro, trifluoromethyl, hydrocarbon groups, particularly lower alkyl groups, ether groups, preferably lower alkoxy and aryloxy groups, acyl groups such as lower alkanoyl, aroyl, carbalkoxy, alkylsulphonly or arylsulphonyl groups, sulphonic acid aryl ester groups, acylamino groups, particularly lower alkanoylamino groups such as the acetylamino and chloracetylamino group, aroylamino or carbalkoxyamino groups, carboxylic acid amide and sulphonic acid amide groups optionally mono- or di-substituted at the nitrogen atom, carboxylic or sulphonic acid groups, or acylated sulphonic acid amide groups. Any aromatic rings in these substituents can, naturally, also be substituted by the same kind of substituents.

Thus, o-carboxy-, o-alkoxy-, o-hydroxy-, o-disulphonylamino- diazobenzene and -diazonaphthalene compounds which optionally contain the substituents mentioned above can be used as diazo components for monoazo dyestuffs usable according to the invention. Phenols, naphthols, aminonaphthalenes, 5-pyrazolones, 5-aminopyrazoles, 2,4-dioxyquinolines and acyl acetic acid aryl amides which couple in a position adjacent to the hydroxyl or amino group, are used, for example, as coupling components. Monoazo compounds which are produced from such diazo and coupling components are known. They are starting materials which are much used in the production of heavy metal complex dyestuffs for wool and materials similar thereto. In the present process preferably dicyclic metallisable monoazo dyestuffs are used which are produced from a diazotised aminobenzene compound which, in o-position to the amino group, contains a hydroxyl group and in addition at least one nitro group or, preferably at least one chlorine atom in the benzene nucleus by coupling it with a hydroxynaphthalene compound coupling in a position adjacent to a hydroxyl group, particularly chlorinated 1-hydroxynaphthalenes coupling in the 2-position or more particularly 2-naphthol.

In disazo dyestuffs usable according to the invention the naphthalene ring of the middle component can contain, as metal complex forming group, e.g. a carboxyl or hydroxyl group and, as a group which can be converted into such, it can contain, e.g. halogen, a lower alkoxy, acyloxy, lower carbalkoxy or carboxymethoxy group. Also hydrogen or the —SO₃H group can be mentioned as substituents which are converted under the metallising conditions into metal complex forming groups. These are exchanged for hydroxyl groups by a known process for oxidising coppering. Naphthalene middle components the metallisable group of which contains an alkoxy group such as the methoxy or ethoxy group are preferred both in view of technical advantages in building up the metal complexes and also in view of the valuable properties of the end products.

The azo bridges in the naphthalene nucleus are advantageously in the p-position to each other. Thus, preferably, disazo dyestuffs are used which, as middle component, contain the radical of a 2-hydroxy- or 2-alkoxynaphthalene compound in which the two azo bridges are in the 1- and 4-position.

The middle component, however, can also be the radical of a 2-hydroxynaphthalene compound in which the two azo linkages are in the 1,5-position. Examples of such naphthalene compounds are:

1-amino-2-methoxy-naphthalene,
1-amino-2-ethoxy-naphthalene,
1-amino-2-methoxy-naphthalene-6- or -7-sulphonic acid,
1-amino-2-ethoxy-naphthalene-6- or -7-sulphonic acid,
1-amino-2-methoxy-6-hydroxy-naphthalene,
2-amino-1,5-dihydroxy-naphthalene-4,8-disulphonic acid.

As end components taking part in the complex formation which have a 5- to 6-membered hetero ring system with the atom sequence

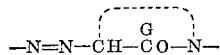

the disazo dyestuffs contain, for example, radicals of 5-pyrazolones, 3-5-dioxo-pyrazolidines, oxindoles, 4-hydroxy-2-quinolones or barbituric acids which can contain the substituents usual in azo dyestuffs listed above. However, disazo dyestuffs are preferred which contain, as end component, the radical of a 1-aryl-5-pyrazolone coupled in the 4-position, particularly an optionally further substituted 1-phenyl-5-pyrazolone, such as 1-phenyl-3-methyl-5-pyrazolone,
1-phenyl-3-methyl-5-pyrazolone-2'-, 3'- or -4'-sulphonic acid,
1-phenyl-3-methyl-5-pyrazolone-3'- or -4'-sulphonic acid amide,
1-phenyl-3-methyl-5-pyrazolone-2'-, -3'- or -4'-methyl-sulphone or 1-phenyl-3-methyl-5-pyrazolone-3'- or -4'-ethyl sulphone,
1-(2'-, 3'- or 4'-chlorophenyl)-3-methyl-5-pyrazolone,
1-(2'-, 3'- or 4'-methylphenyl)-3-methyl-5-pyrazolone,
1-(2'-, 3'- or 4'-methoxyphenyl)-3-methyl-5-pyrazolone,
1-(2'-, 3'- or 4'-ethoxyphenyl)-3-methyl-5-pyrazolone.

As starting components for the disazo dyestuffs, for example diazonium salts of aromatic amines of the benzene or naphthalene series and of heterocyclic amines of aromatic character such as diazotizable amines of the heterocycles: thiazole, benzothiazole, thiadiazole, benzotriazole, benzimidazole, pyrazole, triazole, tetrazole or indazole can be used. These diazo components too can contain the substituents usual in azo dyestuffs listed above. Those diazo components which belong to the benzene series lead to particularly valuable end products. As examples of such diazo components can be mentioned: aminobenzene, 1-amino-2-, -3- or -4-chlorobenzene, 3,4-dichloro-1-aminobenzene, 1-amino-4-chloro - benzene-3-sulphonic acid, 1-amino-2-chlorobenzene - 4 - sulphonic acid, 1-aminobenzene-4-carboxylic acid, 1-amino-2-, -3- of -4-methylbenzene, 1-amino-2, -3- or -4-methoxybenzene, 1-amino-2-, -3- or -4-ethoxybenzene, 3- or 4-methylsulphonyl-1-aminobenzene, 1-amino-3- or -4-methylsulphonylaminobenzene, 1-aminobenzene-2-, -3- or -4-sulphonic acid, 1-aminobenzene-3- or -4-sulphonic acid amide, 1-amino-benzene-4-sulphonic acid-N-methyl- or -N-ethyl-amide.

Some of the disazo dyestuffs usable according to the invention which are capable of forming dicyclic heavy metal complexes are new; they can be produced, however, by methods known per se. Disazo dyestuffs, as defined, in which the azo groups in the naphthalene radical are in p-position to each other are produced, for example, as follows. The diazonium compound (A) of an arylamine or of a heterocyclic amine of aromatic character is coupled in a weakly acid medium, e.g. in acetic or formic acid medium, with a 2-alkoxy-1-aminonaphthalene compound (B) coupling in the 4-position. The amino monoazo dyestuffs so obtained is diazotised and is coupled with the coupling component (C) containing a 5- or 6-membered hetero ring system having the atomic sequence

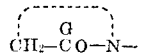

This latter coupling is performed in an alkaline medium, e.g. in the presence of alkali metal carbonates, optionally with the addition of agents which promote the coupling, for example, tertiary nitrogen bases such as pyridine or picoline.

A variation of the latter process consists in using a 1-aminonaphthalene compound having an unsubstituted o-position instead of the 2-alkoxy-1-aminonapthalene compound (B). After the coupling of the diazo-azo compound with the coupling component (C), the o-mono-oxy-disazo dyestuff obtained is coppered under oxidising conditions, e.g. by the joint action in a weakly acid medium of a copper salt and a suitable oxidising agent such as hydrogen peroxide, or by treatment in a neutral or weakly acid medium at a raised temperature with elementary oxygen, e.g. air, in the presence of metallic copper. As required, the copper complex compounds so obtained can be converted in the usual way into the metal-free o,o'-dihydroxy-azo dyestuffs, e.g. with strong acids or, after di-coppering they can be converted into the corresponding metal complex compounds by the action of agents giving off co-ordinative hexavalent metal.

A further method for the production of the disazo dyestuffs as defined consists in coupling the diazonium compound (A) with a 1-aminonaphthalene compound containing a sulphonic acid group in the 2-position, which aminonaphthalene compound couples in the 4-position, then diazotising the aminoazo compound obtained, converting it into a 2-oxy-1-diazo compound, e.g. by treatment with an oxidising agent such as natrium hypochlorite solution in a strongly alkaline medium and then coupling with a coupling component (C).

Metal complex dyestuffs according to the invention which are of particular interest as textile dyestuffs for polyamide fibres are principally those in which, of the two co-ordinated azo dyestuffs, at least one contains a sulphonyl substituent which increases the water solubility. As such can be used: sulphonic acid groups, sulphonic acid amide groups or lower alkylsulphonyl groups. However, the end product advantageously does not contain more than one sulphonic acid group.

In addition to the substituents usual in azo dyestuffs listed above, the metal complex dyestuffs according to the invention can also contain so-called fibre reactive groupings, i.e. groups which can enter into a chemical bond with particular types of fibres such as polyamide fibres and especially cellulose fibres.

Such groupings are bound to an aromatic ring of the dyestuff structure direct or by way of a bridging member such as oxygen, sulphur, preferably however, by way of an amino, a lower alkylamino, a sulphonylamino, a carbonylamino or an ureido group. They can be introduced into the monoazo or disazo molecule by the usual conversion reactions during different steps of the manufacture of the new dyestuffs. By such reactions are meant, e.g. the condensation of a component containing an acylatable amino group with a compound having, in addition to the reacting substituent, at least one other radical which can be split off as anion under dyeing conditions or having a poly linkage to which addition can be made. Substituents which can be split off as anion are above all mobile halogen atoms, such as bromine, fluorine, or preferably chlorine, the mobility of which is due, for example, to the bond at α- or β-carbon atoms in negatively substituted aliphatic radicals, to the presence of electron-attracting substituents in o- and/or p-position in aromatic radicals or to the presence of tertiary ring-nitrogen atoms in heterocyclic rings of aromatic character, preferably 6-membered heterocyclic rings containing at least two tertiary nitrogen atoms in the ring. Other mobile substituents which can be split off as anion are hydroxyl groups esterified with strong acids, of aliphatic radicals having electron-attracting substituents in the β-position, e.g. β-hydroxyalkyl sulphonyl or 2-hydroxyalkyl sulphamyl groups esterified with sulphuric acid.

The

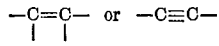

group in a position adjacent to an electron-attracting group is an example of a poly linkage to which addition can be made; examples of such fibre reactive groupings capable of addition are the vinyl sulphone group, the acroyl or methacroyl radical as well as the acid radical of propiolic acid. Preferably, fibre reactive groupings are intoduced into the end products, e.g. by acylating complex dyestuffs containing acylatable amino groups with acids or reactive functional derivatives of these acids which, in the acid radical, contain one of the fibre reactive groupings mentioned above.

Preferably the following are used as such acylating agents:

(a) s-Triazine compounds containing at least two halogen atoms bound to ring carbon atoms such as cyanuric chloride, cyanuric bromide, or primary condensation products of cyanuric chloride or bromide with, e.g. ammonia, amines, alkanols, alkyl mecaptans, phenols or thiophenols;

(b) Pyrimidines containing at least two reactive halogen atoms such as 2,4,6-trichloro- or 2,4,6-tribromo-pyrimidine, 2,4,5,6-tetrachloro- or 2,4,5,6-tetrabromo-pyrimidine;

(c) Halogen pyrimidine carboxylic acid halides such as 2,4-dichloro-pyrimidine-5- or -6-carboxylic acid chloride;

(d) 2,3-dihalogen-quinoxaline carboxylic or sulphonic acid halides such as 2,3-dichloro-quinoxaline-6-carboxylic acid chloride or -6-sulphonic acid chloride;

(e) 2-halogen benzothiazole or 2-halogen benzoxazole carboxylic or sulphonic acid halides such as 2-chlorobenzothiazole- or 2-chlorobenzoxazole-5- or -6-carboxylic acid chloride or -5- or -6-sulphonic acid chloride, (f) Anhydrides and halides of aliphatic unsaturated carboxylic acids such as maleic acid anhydride, acrylic acid chloride, methacrylic acid chloride and propiolic acid chloride;

(g) Anhydrides and halides of aliphatic or aromatic carboxylic acids containing mobile halogen atoms such as chloracetyl chloride, β-chloropropionic acid chloride, α,β-dichloropropionic acid chloride, α-chloro- or β-chloroacrylic acid chloride, chloromaleic acid anhydride, β-chloro-crotonic acid chloride or fluoro-nitro- or chloronitro- benzoic acid halides in which the fluorine or chlorine atom is in the o- and/or p-position to the nitro group; also halogen phthalazine carboxylic acid halides such as 1,4-dichloro- or 1,4-dibromo-phthalazine-6-carboxylic acid chloride or bromide, halogen quinazoline carboxylic acid halides such as 2,4-dichloro-quinazoline-6- or -7-carboxylic acid chloride, halogen-6-pyridazonyl-1-alkanoyl- or -1-benzoyl-halides such as 4,5-dichloro-6-pyridazonyl-1-propionyl chloride or 4,5-dichloro-6-pyridazonyl-1-benzoyl chloride.

The dicyclic metal complexes containing a coordinative hexavalent heavy metal atom per dyestuff molecule in complex linkage, which are to be used according to the invention, are obtained by known methods, for example by reacting the metallisable monoazo dyestuffs or disazo dyestuffs of the type defined above with agents which give off coordinative hexavalent heavy metal. In the process according to the invention, principally chromium and, optionally, also cobalt are used as coordinative hexavalent heavy metal. Preferably the usual salts of these metals are used as agents giving off metal.

Suitable salts of chromium are, e.g. simple salts of trivalent chromium such as chromic fluoride, chromic chloride, chromic sulphate, chromic acetate, chromic formate, potassium chromic sulphate or ammonium chromic sulphate, optionally in the presence of such compounds which can form soluble complex compounds with the chromium salts in an alkaline medium, e.g. tartaric, citric, lactic or salicylic acid.

Also the chromates, e.g. sodium or potassium chromate or bichromate are excellently suitable for the metallisation of the azo dyestuffs. In this case, the metallisation is performed in a strongly caustic alkaline medium, to which, optionally, reducing substances such as glucose can be added.

Cobaltous formate, cobaltous acetate or cobaltous sulphate, for example, serve as cobalt compounds. Cobalt complex compounds with ammonia, organic acids, oxy acids or polyoxy compounds can also be used.

The metallisation is performed, e.g. in aqueous solution or suspension as well as in an organic solvent, advantageously at temperatures of 90 to 150° C., optionally under pressure and, preferably, in an acid medium. Suitable solvents are, e.g. amides of lower fatty acids such as formamide or dimethyl formamide, alcohols such as alkanols or alkylene glycols and their lower monoalkyl ethers and also mixtures thereof. When an o-alkoxy-o'-hydroxy azo dyestuff is used as starting material, for example, then the metallisation is to be performed under such conditions, e.g. at temperatures of 120–140° C., that the alkyl group is split off from the -o-alkoxy-o'-hydroxy azo grouping.

The so-called 1:1 metal complex of a metallised azo dyestuff containing one heavy metal atom per dyestuff molecule, which is employed for the addition of the metal free azo dyestuff, can also contain further ligands at the heavy metal atom depending on the production method and reaction medium, for example, aquo-, acido-, hydroxy-complexes of the metal containing dyestuff. The 1:1 metal complex can even contain chelated ligands which can be displaced by the second, dicyclic chelating azo dyestuff such as is the case, e.g. in the salicylato or tartrato compounds of metal containing azo dyestuffs containing one chromium atom per dyestuff molecule.

Preferred heavy metal containing azo dyestuff to be used are chromium compounds which contain, per chromium atom, 1 molecule of the advantageously sulphonated disazo dyestuff characterised above bound in complex linkage. The preference of the metal containing disazo dyestuffs is due to the easier accessibility of their sulphonated 1:1 metal complexes.

The metal free azo dyestuffs are added to the 1:1 metal complex compounds, e.g. in a weakly acid, neutral or, advantageously, in an alkaline medium, at a slightly raised temperature, e.g. 40 to 95° C. The addition is advantageously performed in aqueous or organic, e.g. alcoholic, medium and, preferably, in the presence of mineral acid buffering agents or alkaline agents such as sodium acetate, sodium carbonate, sodium hydroxide, or the corresponding potassium or ammonium compounds. The present process is performed particularly advantageously in aqueous-organic medium, e.g. in aqueous ethylene glycol, ethylene glycol monomethyl ether, diethylene glycol or aqueous amides of lower fatty acids, e.g. acetamide, formamide or dimethyl formamide. In most cases the addition is made quickly and completely.

When a dicyclic, metallising azo dyestuff of the type mentioned above having an alkoxy group in a position adjacent to the azo bond is used, then the addition according to the invention is performed under conditions which ensure the de-alkylation of the alkoxy group. In this case, the addition is advantageously performed in organic solvents, e.g. in formamide, dimethyl formamide or diethylene glycol at 120° to 160° C.

Also the so-called mixed metallisation, i.e. the metallisation of a mixture consisting of a metallisable monoazo and a metallisable disazo dyestuff with agents giving off heavy metal is also considered as falling under the process according to the present invention. This is because, in all probability, first a so-called 1:1 metal complex is formed which can contain, e.g. colourless ligands such as salicylic acid. This 1:1 metal complex then forms a 2:1 complex with the other metal free dyestuff. The new 1:2 metal complex compounds can be obtained from aqueous or aqueous-organic solutions by salting out, and from organic solutions they are obtained by precipitation with water or sodium chloride solution or by distillation of the organic solvent.

The new metal containing azo dyestuffs according to the invention are suitable for the dyeing of organic materials of the most different types in brown, olive, blue, navy blue, green to black shades. Water soluble dyestuffs according to the invention are preferred for the dyeing of textiles especially wool, but are also suitable for the dyeing of silk, casein, superpolyamide and superpolyurethane fibres and leather and furs.

Particularly suitable for these purposes are the dyestuffs of the formula $$\left[\begin{array}{c} \text{structure} \end{array}\right] \quad (\text{I})$$

wherein:

Me represents a 1.2 dyestuff complex-forming heavy metal atom, preferably chromium, A represents a divalent benzene or naphthalene radical the free bonds of which are in ortho-position relative to each other;

B represents a divalent naphthalene or pyrazolone radical, the free bonds of which are in ortho-position relative to each other, or an acetoacetic acid anilide radical of the formula $$\text{phenyl-NH-CO-C}^\alpha\text{=C}^\beta\text{-CH}_3$$

whereof $C^\alpha$ is linked to the adjacent azo bridge and $C^\beta$ is linked to $Y_2$;

$Y_1$ represents one of the divalent bridge members —O—, —CO—O— the carbon atom of which member is linked to A, lower alkyl—$SO_2$—N< or $$\text{phenyl—SO}_2\text{—<}$$

$Y_2$ represents one of the divalent bridge members $$\text{—O—NH— or —N—}$$
$$\qquad\qquad\qquad\quad\ \ |$$
$$\qquad\qquad\qquad\quad\ \ R$$

wherein R represents lower alkyl or phenyl,

D represents phenyl, naphthyl-(1), or pyridyl or benzimidazolyl which are linked to the adjacent azo bridge by ring carbon atoms other than that in 2-position, benzothiazolyl, triazolyl, or benzotriazolyl, X represents one of the divalent radicals $$\text{—CO—N—CO—, —C=N—, or —CO—N—}$$
$$\qquad\quad |\qquad\qquad\ \ |\qquad\qquad\quad |$$
$$\qquad\quad R_3\qquad\qquad R_2\qquad\qquad\quad R_3$$

the nitrogen atom of the latter two radicals being linked to the adjacent ring nitrogen atom in the above formula;

$R_1$ represents hydrogen, lower alkyl, phenyl, naphthyl, lower alkylsulphonyl or phenylsulphonyl;

$R_2$ represents lower alkyl, preferably methyl, carbamoyl, N-mono-lower alkyl-carbamoyl or N,N-di-lower alkyl-carbamoyl;

$R_3$ represents phenyl, chlorophenyl or lower alkyl-phenyl;

$m$ represents a number ranging from 1 to 2, and $M^+$ represents a hydrogen ion or an alkali metal ion, but preferably represents a sodium or potassium ion, each of the groupings —($SO_3^-M^+$) being linked to a carbon atom of a carbocyclic aromatic ring in the dyestuff molecule; and wherein carbocyclic aromatic nuclei of A, B, D, E, $R_1$ and $R_3$, independently of each other, are otherwise unsubstituted or substituted by substituents which do not elongate the resonance system of the dyestuff molecule.

The water-insoluble dyestuffs corresponding to those of Formula I but free from —($SO_3^-M^+$) groups are used principally for the dyeing of lacquers, oils and waxes, paper, viscose, nylon, cellulose ether and cellulose ester spinning masses and polyester condensates. The new dyestuffs described hereinbefore can also be used for the printing of wool and of the other materials mentioned above.

A preferred subclass of water-soluble dyestuffs according to the invention are those of the formula $$\left[\begin{array}{c} \text{structure} \end{array}\right] \quad (\text{II})$$

wherein:

$B_1$ represents the divalent radical of the formula $$\text{naphthyl—R}_7$$

$D_1$ represents phenyl or naphthyl-(1);

$R_4$ represents from one to two of the following: hydrogen, halogen of an atomic number of at most 35, nitro and lower alkyl;

each of $R_5$ and $R_6$ represents from one to two of the following: hydrogen, halogen of an atomic number of at most 35, lower alkyl and lower alkoxy;

$R_7$ represents from one to three of the following: hydrogen, chlorine, bromine, lower alkyl and lower alkoxy; and $m$ and $M^+$ have the same meanings as in Formula I;

which dyestuffs have a particularly good affinity to wool, especially those of Formula II in which $m$ represents 1, which latter dyestuffs draw particularly well onto wool from a neutral medium.

The wool dyeings obtained with dyestuffs of Formula II are very level and are distinguished by remarkable fastness to light, very good wet fastness properties, e.g. very good, to excellent fastness to washing, milling, perspiration and sea water, and, in many cases, they are also distinguished by good fastness to alkali and carbonising.

If synthetic polyamide fibres such as nylon are dyed with dyestuffs according to the invention, then level dyeings are obtained which also have very good fastness to light, rubbing, washing and perspiration.

Of the azo dyestuffs according to the invention, those mixed chromium complexes are of principal interest for which an o - hydroxybenzene - azo - o' - hydroxynaphthalene compound is used as monoazo dyestuff. Valuable end products, particularly with regard to the navy blue shades, are obtained with monoazo dyestuffs from 1-diazo-2-hydroxybenzene chlorinated in the 5-position and 2- hydroxynaphthalene or substituted, e.g. chlorinated, 1-hydroxynaphthalenes which couple in the 2-position. Also with regard to the valuble navy blue shades, the metallised component of the disazo dyestuff is advantageously a 4 - (2' - hydroxynaphthalene - (1') - azo - 1 - phenyl-3-methyl-5-hydroxy-pyrazole which contains a sulphonic acid group in the naphthalene nucleus.

Most preferred because of the superior fastness properties of their dyeings on wool, silk and synthetic polyamide fibres are those of the dyestuffs falling under Formula II in which each of $R_4$ and $R_7$ represents hydrogen or chlorine, $D_1$ represents phenyl, $R_5$ represents hydrogen, chlorine, lower alkyl or lower alkoxy, $m$ represents 1, and naphthalene nucleus E bears the $-(SO_3^-M^+)$ substituent in 6-position.

In known azo dyestuffs of related structure, it is often necessary to purify the dyestuffs by recrystallisation or chromatography in order to obtain dyeings with optimal fastness properties, while especially in the most preferred dyestuffs of the invention, such purification is not necessary in order to obtain dyeings of very satisfactory fastness, especially to washing and alkaline milling, for instance, on wool.

Another class of dyestuffs according to the invention comprises dyestuffs which contain fibre-reactive groupings. Such fibre-reactive dyestuffs are useful for the dyeing primarily of cellulosic fibres such as cotton, but also polyamide fibres such as wool or especially of cellulose fibrous material such as staple fibre, jute, ramie, and hemp. To attain sufficient solubility, these fibre-reactive dyestuffs according to the invention should generally contain at least two, and preferably not more than five ionogenic water solubilising groups such as sulphonic acid or carboxylic acid groups in the molecule. Three to four sulphonic acid groups are preferred.

Particularly suitable for the dyeings of the above-mentioned fibre materials are the fibre-reactive dyestuffs of the formula

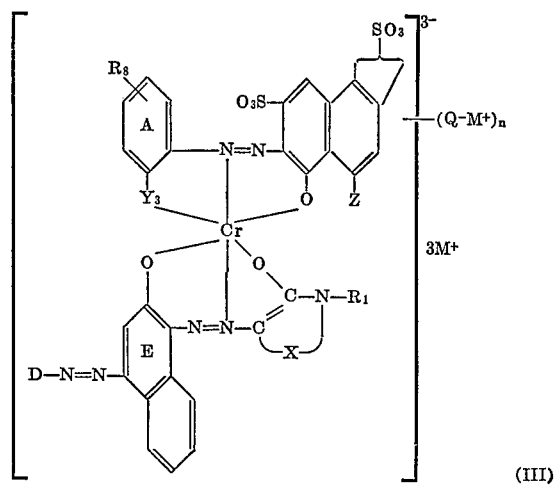

(III)

wherein:

D, $M^+$, $R_1$ and X have the same meanings as in Formula I;

$n$ represents a number ranging from 0 to 3, and preferably from 1 to 2;

$Q^-$ represents $SO_3^-$ or $COO^-$, but preferably $SO_3^-$;

$R_8$ represents from one to two hydrogen, nitro, halogen of an atomic number of at most 35, lower alkyl, or one lower alkylsulphonyl or phenylsulphonyl group;

$Y_3$ represents $-CO-O-$ the carbon atom of which is linked to A, or $-O-$, but preferably the latter on account of the superior light-fastness of the respective dyestuffs;

Z represents (a) triazinyl-amino containing, as a first substituent, a mobile halogen atom and, as further substituent, one of the following: halogen, amino, mononuclear aryl-amino, lower alkyl-amino and alkoxy, (b) pyrimidyl-amino having, as a first substituent, in 5-position thereof, hydrogen or halogen, and as second and third substituents halogen atoms, (c) 2,4-dihalogeno-pyrimidyl-(5)-carbonylamino, (d) 2,4-dihalogeno-pyrimidyl-(6)-carbonylamino, or (e) 2,4-dichloro-quinoxaline-(6)-carbonylamino.

However, preferably, Z represents a reactive grouping as defined under (a); or a grouping as defined under (b) in which the 5-position is occupied by hydrogen; or the grouping defined under (d), or the grouping defined under (e).

All halogen substituents in the reactive groupings Z defined under (a) to (d) above are of an atomic number not exceeding 35.

All benzene nuclei of D, $R_1$, $R_3$ and $R_8$, in Formula III either bear no further substituents apart from a possible $-(Q^-M^+)$ group, or they are further substituted by substituents which do not elongate the resonance system of the dyestuff molecule.

Substituents which do not elongate the resonance system of the molecule of dyestuffs of Formulas I and III and the unsulphonated analogs corresponding to Formula I, have been mentioned hereinbefore. Preferred substituents of this type are those defined under $R_2$, $R_4$, and $R_5$ to $R_8$ inclusive, as well as lower alkyl-sulphonyl, phenylsulphonyl, sulphamoyl, N-lower alkyl-sulphamoyl and N,N-di-lower alkyl-sulphamoyl.

In this specification and in the appended claims, the term "lower" applied to "alkyl" and "alkoxy" means such groups having 1 to 5 carbon atoms, and applied to "alkanoyl" and "carbalkoxy" it means such groups having 2 to 5 carbon atoms.

The following non-limitative examples illustrate the invention further. The temperatures are given therein in degrees centigrade.

EXAMPLE I

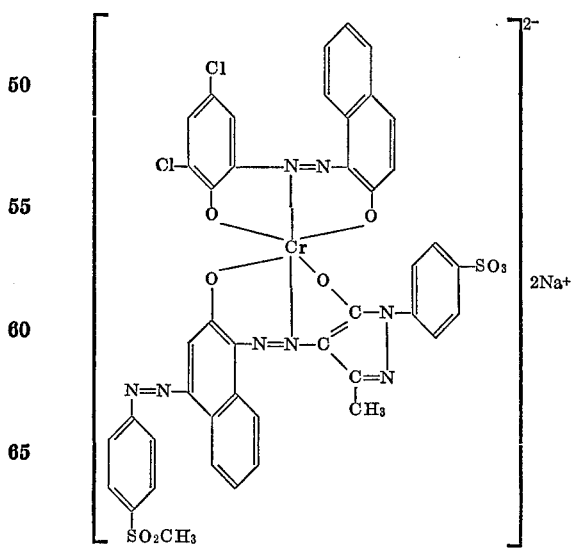

33.3 g. of the monoazo dyestuff from diazotised 4,6-dichloro - 2 - amino - 1 - hydroxybenzene and 2-hydroxynaphthalene are added to a solution at about 80° of 20 g. of solid sodium hydroxide in 800 ml. of water.

65.6 g. of the (1:1) chromium complex compound which corresponds to 5.2 g. of chromium and 60.6 g. of the demethylated disazo dyestuff from diazotised 4-(4'-methylsulphonyl - phenylazo-2-methoxy-1-aminonaphthalene and 1 - (4'-sulphophenyl)-3-methyl-5-pyrazolone are added.

The mixture obtained is heated at 80–85° until the starting products have disappeared.

The dyestuff formed is then precipitated by the addition of sodium chloride, filtered off and dried.

After drying, it is a dark, water soluble powder which dyes wool from a weakly acid bath in navy blue shades having good fastness properties.

In this and all following examples of non-fibre-reactive dyestuffs, the corresponding unsulphonated dyestuffs are obtained in analogous manner, using the same starting materials, but all of them are free from sulphonic acid groups. They dye nylon and cellulose ester spinning masses in shades which are practically the same as those of the sulphonated dyes.

EXAMPLE 2

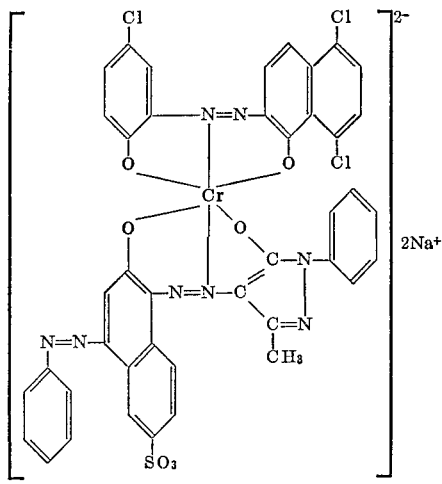

At about 60°, 36.8 g. of the monoazo dyestuff obtained by coupling diazotized 4-chloro-2-amino-1-hydroxybenzene with 5,8-dichloro-1-hydroxynaphthalene are suspended in the solution of 40 g. of calcined sodium carbonate in 400 ml. of water and 600 ml. of formamide. 57.8 g. of the (1:1) chromium complex compound, corresponding to 5.2 g. of chromium and 52.8 g. of the demethylated disazo dyestuff from diazotised 4-phenylazo-2-methoxy-1-aminonaphthalene-6-sulphonic acid and 1-phenyl-3-methyl-5-pyrazolone, are then added.

The mixture is heated for 1 hour at 80–85° whereupon a dark blue suspension which can easily be stirred is formed. The dyestuff formed is salted out with sodium chloride, filtered off, washed with diluted sodium chloride solution and dried.

It is a dark, water soluble powder which dyes wool from a neutral or weakly acid bath in full navy blue shades having good fastness properties.

Dyestuffs with similar good properties are obtained when using in the above example in lieu of 4-chloro-2-amino-1-hydroxybenzene an equivalent amount of 4-bromo- or 4-fluoro-2-amino-1-hydroxybenzene, and/or in lieu of 5,8-dichloro-1-hydroxynaphthalene an equivalent amount of 2-bromo-6-hydroxynaphthalene or 4-bromo-1-hydroxynaphthalene or 4-methyl-1-hydroxynaphthalene or 7-methoxy-2-hydroxynaphthalene.

Other dyestuffs of similar good dyeing properties are obtained by using in the above Example 2 in lieu of 4-phenylazo-2-methoxy-1-aminonaphthalene - 6 - sulphonic acid an equivalent amount of 4-[benzimidazolyl-(4)-azo]-2-methoxy- or 4-[benzothiazolyl - (4) - azo]-2-methoxy-1-aminonaphthalene-6- or -7-sulphonic acid or 4-(4'-chloro-phenylazo)-2-methoxy-1-amino - naphthalene-6- or -7-sulphonic acid.

EXAMPLE 3

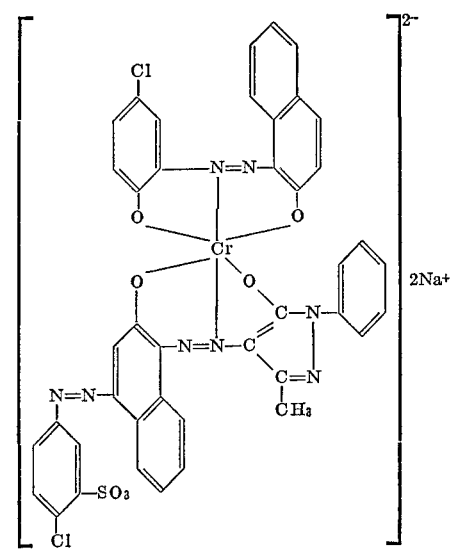

At about 60°, 29.9 g. of the monoazo dyestuff obtained by coupling diazotized 4-chloro-2-amino-1-hydroxybenzene with 2-hydroxynaphthalene are suspended in a solution of 40 g. of calcinated sodium carbonate in 800 ml. of ethylene glycol monomethyl ether and 200 ml. of water.

61.3 g. of the (1:1) chromium complex compound, corresponding to 5.2 g. of chromium and 56.3 g. of the disazo dyestuff obtained from diazotised 4-(4'-chloro-3'-sulphophenylazo)-2-hydroxy-1-aminonaphthalene and 1-phenyl-3-methyl-5-pyrazolone, are then added.

The mixture so obtained is kept for 1 hour at 80–85° whereupon a dark blue solution is formed. The dyestuff formed is then precipitated by the addition of saturated sodium chloride solution, filtered off and dried. After drying, it is a dark, water soluble powder which dyes wool and synthetic polyamide fibers such as nylon from a neutral to weakly acid bath in navy blue shades having good fastness properties.

Another dyestuff of similar good dyeing properties is obtained when replacing 4-(4'-chloro-3'-sulphophenylazo)-2-hydroxy-1-aminonaphthalene by an equivalent amount of the 4'-bromo analog.

EXAMPLE 4

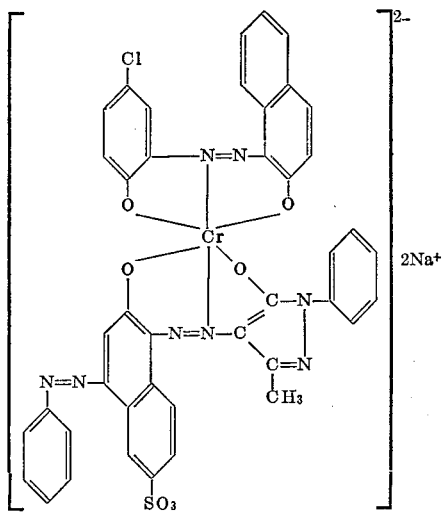

29.9 g. of the monoazo dyestuff obtained by coupling diazotised 4-chloro-2-amino-1-hydroxybenzene with 2- hydroxynaphthalene are added to a mixture of 400 ml. of water, 600 ml. of formamide and 40 g. of calcinated sodium carbonate.

57.8 g. of the (1:1) chromium complex compound, which corresponds to 5.2 g. of chromium and 52.8 g. of the demethylated disazo dyestuff from diazotised 4-phenylazo-2-methoxy-1-aminonaphthalene - 6 - sulphonic acid and 1-phenyl-3-methyl-5-pyrazolone, are then added.

The reaction mixture is heated at 80–85° until the starting materials can no longer be traced. The mixed complex dyestuff formed is then precipitated by the addition of sodium chloride. It is filtered off, washed with dilute sodium chloride solution and dried. After drying, it is a dark powder which dyes wool from a neutral to weakly acid bath in navy blue shades having good fastness properties.

Dyestuffs of similar good properties are obtained by replacing the 4-phenylazo-2-methoxy - 1 - aminonaphthalene-6-sulphonic acid in the above example by an equivalent amount of (a) 4-(4'-bromo-; (b) 4-(4'-fluoro-; (c) 4-(4'-chloro-; (d) 4-(4'-ethoxy-; (e) 4-(4'-methyl-; (f) 4-(2'-methoxy- or (g) 4-(4'-methoxy-phenylazo)-2-methoxy-1-amino-naphthalene-6-sulphonic acid, respectively.

Other dyestuffs of similar good properties are obtained when replacing, in the above example, 1-phenyl-3-methyl-5-pyrazolone by an equivalent amount of one of the following:

(g) 1-(3'-bromophenyl)-3-methyl-5-pyrazolone,
(h) 1-(4'-fluorophenyl)-3-methyl-5-pyrazolone,
(i) 1-(4'-methoxyphenyl)-3-methyl-5-pyrazolone,
(j) 1-(4'-ethoxyphenyl)-3-methyl-5-pyrazolone,
(k) 1-(2'-ethylphenyl)-3-methyl-5-pyrazolone,
(l) 1-(2',3'-dimethylphenyl)-3-methyl-5-pyrazolone,
(m) 1-(3',4'-dichlorophenyl)-3-methyl-5-pyrazolone,
(n) 3-methyl-5-pyrazolone,
(o) 1,3-dimethyl-5-pyrazolone,
(p) 1-isopropyl-3-methyl-5-pyrazolone,
(q) 1-[naphthyl-(1')]-3-methyl-5-pyrazolone,
(r) 1-(phenylsulphonyl)-3-methyl-5-pyrazolone,
(s) 1-(methylsulphonyl)-3-methyl-5-pyrazolone,
(t) 1-phenyl-3-carbamoyl-5-pyrazolone,
(u) 1-phenyl-3-(N-methyl-carbamoyl)-5-pyrazolone,
(v) 1-phenyl-3-(N,N-dimethyl-carbamoyl)-5-pyrazolone,
(w) 1-methyl-3-phenyl-barbituric acid,
(x) 1-methyl-3-(2'-methylphenyl)-barbituric acid, and
(y) 1-(3'-sulfophenyl)-3-methyl-5-pyrazolone.

EXAMPLE 5

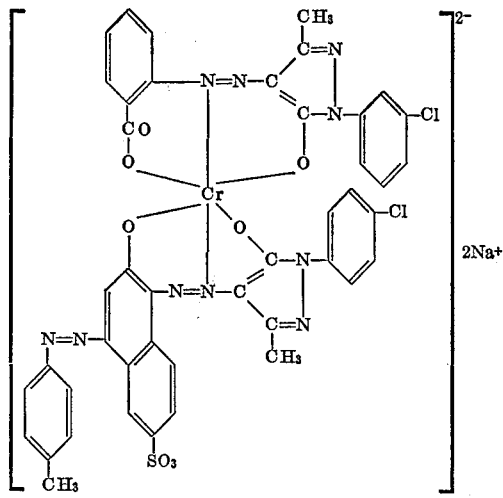

At about 80°, 35.7 g. of monoazo dyestuff from diazotised 2-aminobenzoic acid and 1-(3' - chlorophenyl) - 3 - methyl-5-pyrazolone are dissolved in a mixture of 100 ml. of water, 900 ml. of ethylene glycol monomethyl ether and 40 g. of calcinated sodium carbonate.

62.7 g. of the (1:1) chromium complex compound, which corresponds to 5.2 g. of chromium and 57.7 g. of the demethylated disazo dyestuff from diazotised 4-(4'-methylphenylazo)-2-methoxy-1-aminonaphthalene-6 - sulphonic acid and 1-(4'-chlorophenyl)-3-methyl-5-pyrazolone, are added to this solution.

The mixture is heated at 80–85° until the starting materials have disappeared.

The dyestuff formed is then precipitated by dilution with sodium chloride solution. It is filtered off, washed with dilute sodium chloride solution and dried.

After drying, it is a dark, water soluble powder which dyes wool from a neutral to weakly acid bath in olive green shades having good fastness properties.

EXAMPLE 6

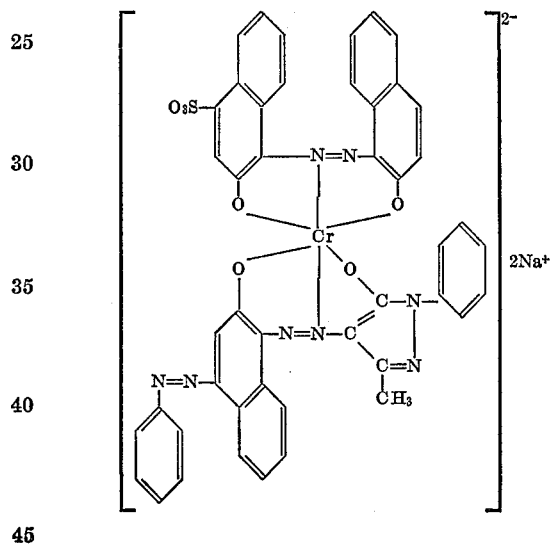

At about 80°, 44.8 g. of the demethylated disazo dyestuff from diazotised 4-phenylazo-2-methoxy-1-aminonaphthalene and 1-phenyl-3-methyl-5-pyrazolone are added to a solution of 20 g. of solid sodium hydroxide in 800 ml. of water and 400 ml. of ethylene glycol monoethyl ether.

44.4 g. of the (1:1) chromium complex compound, which corresponds to 5.2 g. of chromium and 39.4 g. of the monoazo dyestuff from diazotised 2-hydroxy-1-aminonaphthalene-4-sulphonic acid and 2-hydroxynaphthalene, are then added.

The mixture obtained is heated at 80–85° until the starting products have disappeared.

The dyestuff formed is then precipitated by the addition of sodium chloride, filtered off and dried.

After drying, it is a dark, water soluble powder which dyes wool from a neutral to weakly acid bath in navy blue shades having good fastness properties.

If, in this example, the (1:1) chromium complex compound from diazotised 2-hydroxy-1-aminonaphthalene-4-sulphonic acid and 2-hydroxynaphthalene is replaced by 47.6 g. of the (1:1) cobalt complex compound which corresponds to 5.9 g. of cobalt and 41.9 g. of the monoazo dyestuff from diazotised 4-nitro-2-amino-1-hydroxybenzene-6-sulphonic acid and 1-phenyl-3-methyl-5-pyrazolone then a dyestuff is obtained which dyes wool from a neutral to weakly acid bath in brown shades.

EXAMPLE 7

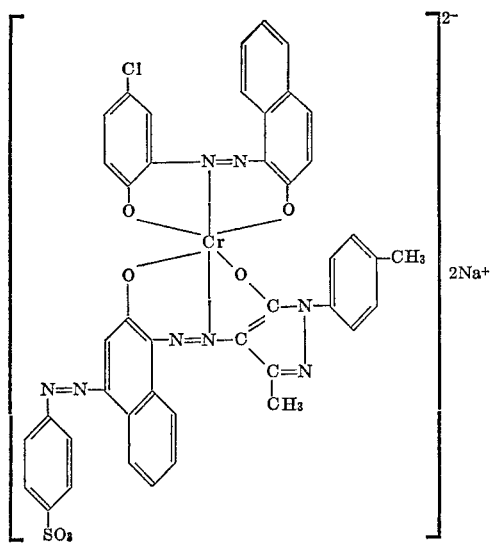

54.2 g. of the disazo dyestuff obtained by coupling diazotised 4-(4'-sulphophenylazo)-2-hydroxy - 1 - aminonaphthalene and 1-(4'-methylphenyl) - 3-methyl - 5-pyrazolone are added to a mixture of 400 ml. of water, 600 ml. of formamide and 40 g. of calcinated sodium carbonate.

34.9 g. of the (1:1) chromium complex compound, which corresponds to 5.2 g. of chromium and 29.9 g. of the monoazo dyestuff from diazotised 4-chloro-2-amino-1-hydroxybenzene and 2-hydroxynaphthalene, are then added.

The reaction mixture is heated at 80–85° until the starting products have disappeared. The mixed complex dyestuff formed is then precipitated by the addition of sodium chloride. It is filtered off, washed with dilute sodium chloride solution and dried.

After drying, it is a dark powder which dyes wool from a neutral to weakly acid bath in navy blue shades having good fastness properties.

The following Table I contains other dyestuffs according to the invention which are obtained by using the methods described in the above Examples 1 to 7, if the 1:1 chromium complexes given in column II are reacted with the metal free dyestuff given in column III.

TABLE I

| I<br>No. | II<br>1:1 chromium complex from— | III<br>Metal free dyestuff from— | IV<br>Shade of 1:2 chromium complex compound on wool |
|---|---|---|---|
| 8 | (structure) | (structure) | Black. |
| 9 | Same as above | (structure) | Do. |
| 10 | do | (structure) | Do. |
| 11 | do | (structure) | Grey-black. |
| 11a | do | (structure) | Do. |

TABLE I.—Continued

| No. | 1:1 chromium complex from— | Metal free dyestuff from— | Shade of 1:2 chromium complex compound on wool |
|---|---|---|---|
| 12 | ...do... | (2-amino-4-chlorophenol → 1-hydroxy-6-(N,N-dimethylsulfamoyl)naphthalene) | Navy blue. |
| 13 | ...do... | (anthranilic acid → 1-phenyl-3-methyl-5-pyrazolone) | Olive green. |
| 14 | ...do... | (anthranilic acid → 1-(2-methoxyphenyl)-3-methyl-5-pyrazolone) | Do. |
| 15 | (1-amino-2-methoxy-6-sulfo-4-phenylazonaphthalene → 1-phenyl-3-methyl-5-pyrazolone) | (2-amino-4-nitrophenol → 2-phenylaminonaphthalene) | Grey black. |
| 16 | Same as above | (2-amino-3-nitro-5-nitrophenol → 2-naphthol) | Do. |
| 17 | ...do... | (2-amino-3-chloro-4,5-dichlorophenol → 1-naphthol) | Navy blue. |
| 18 | ...do... | (2-amino-3-nitro-5-methylphenol → 2-naphthol) | Do. |

TABLE I.—Continued

| No. | 1:1 chromium complex from— | Metal free dyestuff from— | Shade of 1:2 chromium complex compound on wool |
|---|---|---|---|
| 19 | do | [2-amino-4-nitrophenol] → [2-ethylamino-naphthalene] | Black. |
| 20 | do | [2-amino-4-(phenylsulfonyl)phenol] → [2-(2-hydroxyethylamino)-naphthalene] | Do. |
| 21 | do | [2-amino-4-(methylsulfonyl)phenol] → [2-phenylamino-naphthalene] | Grey-black. |
| 22 | do | [2-amino-4-nitrophenol] → [1-(methoxycarbonylamino)-7-hydroxy-naphthalene] | Blue-grey. |
| 23 | [1-amino-2-methoxy-6-sulfo-4-(phenylazo)naphthalene] → [1-phenyl-3-methyl-5-pyrazolone] | [2-amino-4-nitrophenol] → [1-acetylamino-7-hydroxy-naphthalene] | Blue-grey. |
| 24 | Same as above | [anthranilic acid] → [acetoacetanilide] | Olive green. |
| 25 | do | [2-amino-4-nitrophenol] → [acetoacetanilide] | Greenish-black. |
| 26 | do | [2-amino-4-nitrophenol] → [2-chloro-acetoacetanilide] | Do. |

TABLE I.—Continued
| No. | 1:1 chromium complex from— | Metal free dyestuff from— | Shade of 1:2 chromium complex compound on wool |
|---|---|---|---|
| 27 |  | 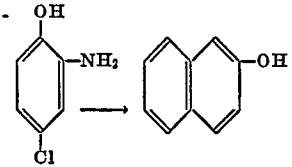 | Blue grey. |
| 28 | Same as above | 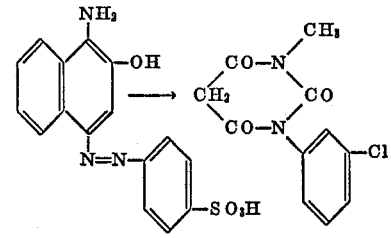 | Grey-blue. |
| 29 | 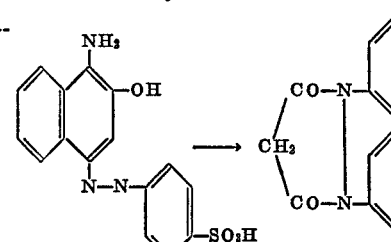 | 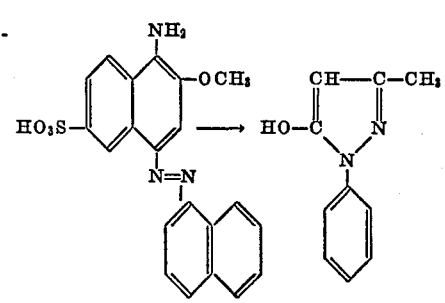 | Blue black. |
| 30 | Same as above | 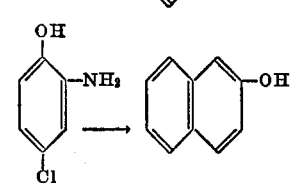 | Black. |
| 31 | 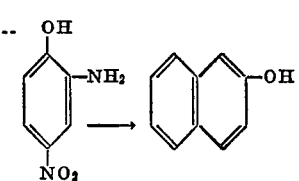 | 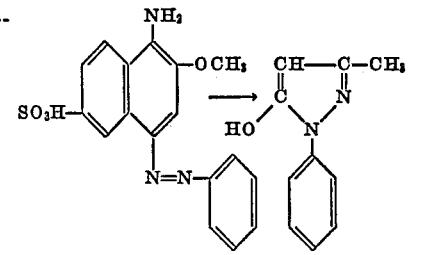 | Black. |
| 32 | Same as above | 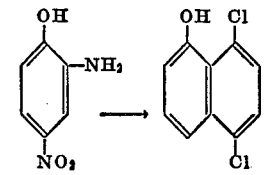 | Navy blue. |
| 33 | do | 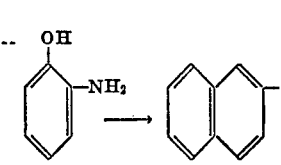 | Brown. |

TABLE I.—Continued

| No. | 1:1 chromium complex from— | Metal free dyestuff from— | Shade of 1:2 chromium complex compound on wool |
|---|---|---|---|
| 34 | (structure) | (structure) | Navy blue. |
| 35 | (structure) | (structure) | Do. |
| 36 | (structure) | (structure) | Do. |
| 37 | (structure) | (structure) (saponified) | Grey-black. |
| 38 | (structure) | (structure) | Navy blue. |
| 39 | Same as above | (structure) | Do. |

TABLE I.—Continued

| No. | 1:1 chromium complex from— | Metal free dyestuff from— | Shade of 1:2 chromium complex compound on wool |
|---|---|---|---|
| 40 | do | 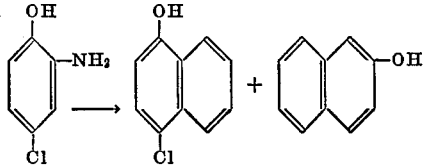 | Do. |
| 41 | 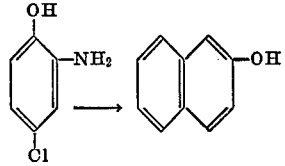 | | Do. |
| 42 | 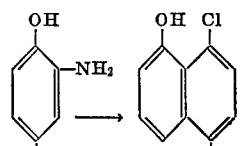 | | Do |
| 43 | 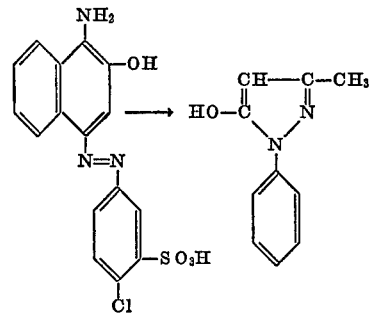 | | Navy blue. |
| 44 | 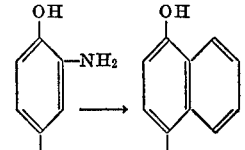 | | Do. |

All of the dyestuffs of Examples 8 to 44, inclusive, are obtained in the form of their sodium salts, one sodium ion being required to neutralize the negative charge of the metal complex.

The potassium salts are obtained by replacing sodium carbonate or hydroxide in the preceding and the subsequent examples by potassium carbonate or hydroxide, respectively, and precipitating the dyestuff in these examples with potassium chloride in lieu of sodium chloride.

EXAMPLE 45

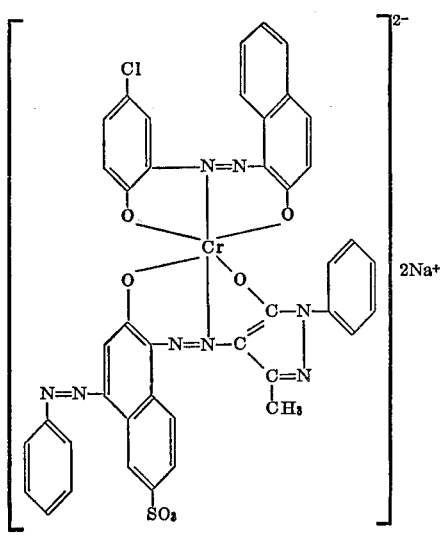

A mixture of 54.2 g. of the disazo dyestuff obtained from diazotised 4-phenylazo-2-methoxy-1-aminonaphthalene-6-sulphonic acid and 1-phenyl-3-methyl-5-pyrazolone, and 34.9 g. of the (1:1) chromium complex compound corresponding to 5.2 g. of chromium and 29.9 g. of the monoazo dyestuff from diazotised 4-chloro-2-amino-1-hydroxybenzene and 2-hydroxynaphthalene, are added to 600 ml. of formamide at room temperature.

The reaction mixture is then heated at 140–145° until the starting products have disappeared. The complex dyestuff formed is precipitated by dilution with sodium chloride solution. It is filtered off, washed with dilute sodium chloride and dried.

After drying, it is a dark, water soluble powder which dyes wool from a neutral to weakly acid bath in navy blue shades which have good fastness properties.

1:2 chromium complex compounds having the shades given in column IV of the following Table II are obtained under the same conditions as given in Example 45 if the metal free dyestuffs given in column III are added to the 1:1 chromium complexes mentioned in column II.

TABLE II

| No. | 1:1 chromium complex from— | Metal free dyestuff from— | Shade of 1:2 chromium complex compound on wool |
|---|---|---|---|
| 46 | [structure: 2-amino-4-chlorophenol → 2-naphthol] | [structure: disazo with OCH₃, SO₃H, N=N-phenyl-OCH₃, and pyrazolone] | Navy blue |
| 47 | [structure: 2-amino-4-nitrophenol → 2-naphthol] | Same as above | Black |
| 48 | [structure: 1-amino-2-naphthol-4-sulphonic acid → 2-naphthol] | [structure: naphthylamine with OCH₃, SO₃H, N=N-phenyl, and pyrazolone] | Navy blue |

TABLE II—Continued

| No. | 1:1 chromium complex from— | Metal free dyestuff from— | Shade of 1:2 chromium complex compound on wool |
|---|---|---|---|
| 49 | [structure: 1-amino-2-methoxy-6-nitronaphthalene-4-sulphonic acid] → | [structure: 2-naphthol] —OH Same as above | Black. |
| 50 | [structure: 2-amino-4-chlorophenol] → | [structure: 2-naphthol] [structure: disazo with pyrazolone/dianilide] | Navy blue. |

The dyestuffs of Examples 46 to 50 are obtained in the form of their sodium or potassium salts when precipitated in the same manner as the dyestuff of Example 45, with sodium chloride or potassium chloride, respectively.

EXAMPLE 51

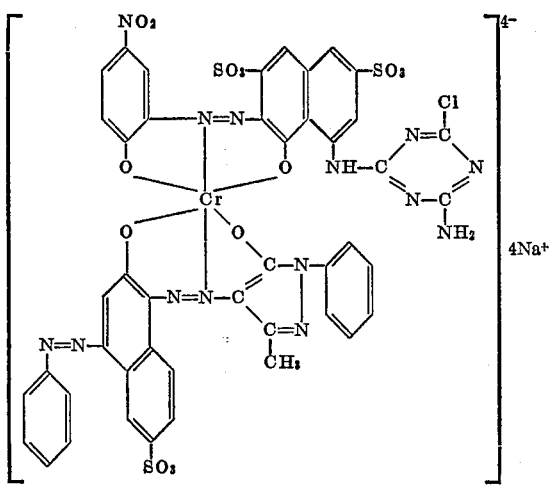

57.8 g. of the (1:1) chromium complex compound which corresponds to 5.2 g. of chromium and 52.8 g. of the demethylated disazo dyestuff from diazotised 4-phenylazo-2-methoxy-1-aminonaphthalene-6-sulphonic acid and 1-phenyl-3-methyl-5-pyrazolone, and 61.3 parts of the monoazo dyestuff of the formula

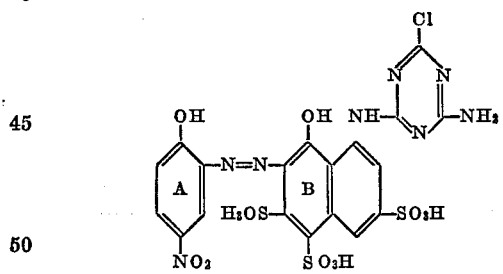

are added to 800 ml. of 80° hot water. The pH of the mixture is adjusted by the addition of sodium hydroxide solution to 6–6.5 while stirring and this pH is maintained until the end of the reaction. The temperature is kept at 80–85° for the whole time. The newly formed dyestuff is in complete solution. It is precipitated by the addition of sodium chloride and filtered off. A dark powder is obtained which easily dissolves in water.

When cotton is pad dyed in the foulard at 30° with an 8% solution of this dyestuff which also contains 20 g. of sodium carbonate and 200 g. of urea per litre, the impregnated goods are dried, then heated for 5 minutes at 140° and, finally, soaped at the boil for 30 minutes, then a deep blue-black dyeing is obtained, which are fast to washing, milling, perspiration, and sea water and also to light and to alkalies.

EXAMPLES 52–90

Reactive dyestuffs of similar good fastness properties are obtained by repeating the procedure of Examples 1–5, 8–26, 29–36, 38–42 and 44, inclusive, but replacing in each of them the reactant affording the coupling component of the monoazo dyestuff moiety by the coupling component of the formula

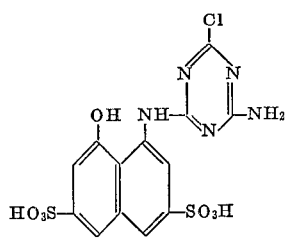

of the monoazo dyestuff employed as starting material in Example 51, supra.

Other valuable reactive 1:2 chromium complex compounds having similar properties are obtained if, instead of the components given in Example 51, the metal-free dyestuffs given in column III of the following Table III and the 1:1 chromium complexes given in column II of the same table are used with otherwise the same procedure. The shades of the 1:2 complex compounds are given in column IV of the table.

TABLE III

| No. | 1:1 chromium complex from— | Metal free dyestuff from— | Shade of 1:2 chromium complex compound on cotton |
|---|---|---|---|
| 91 | [structure] | [structure] | Blueish black. |
| 92 | Same as above | [structure] | Do. |
| 93 | do | [structure] | Do. |
| 94 | do | [structure] | Do. |
| 95 | do | [structure] | Do. |
| 96 | do | [structure] | Do. |

TABLE III—Continued

| No. | 1:1 chromium complex from— | Metal free dyestuff from— | Shade of 1:2 chromium complex compound on cotton |
|-----|----------------------------|---------------------------|--------------------------------------------------|
| 97 | 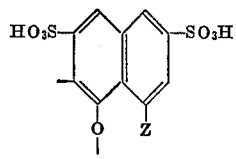 | 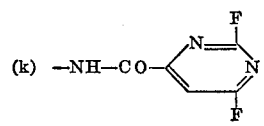 Same as above | Do. |
| 98 | Same as above | 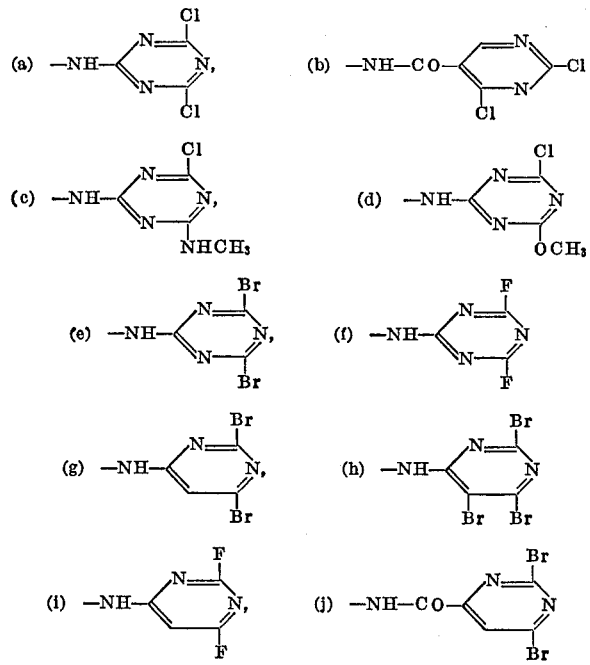 | Do. |

Reactive dyestuffs of similar good fastness properties are obtained when repeating Examples 51 to 98 but using in each of them, as starting material, a monoazo dyestuff consisting of the same diazo component as in the aforesaid examples, and as coupling component, one of each of the coupling components (a) to (k) falling under the formula in which Z is one of the fibre-reactive groupings (a) —NH— ... Cl, (b) —NH—CO— ... Cl, (c) —NH— ... Cl, (d) —NH— ... Cl,
    NHCH₃              OCH₃

(e) —NH— ... Br, (f) —NH— ... F,
    Br                 F (g) —NH— ... Br, (h) —NH— ... Br,
    Br                 Br (i) —NH— ... F, (j) —NH—CO— ... Br,
    F                 Br and (k) —NH—CO— ... F
              F respectively.

All dyestuffs of Examples 51 to 98, inclusive, are obtained in the form of their sodium or potassium salts, depending on whether in their preparation sodium or potassium hydroxides or carbonates have been used, and whether they are precipitated with sodium chloride as in Example 51 or with potassium chloride.

EXAMPLE 99

4 g. of the chromium containing dyestuff produced according to Example 1 are dissolved in 400 ml. of water and 100 g. of well wetted wool are introduced into the dyebath at 40–50°. The bath is brought to the boil within half an hour, kept at the boil for 45 minutes and then the wool is rinsed with cold water and dried. The navy blue dyeing obtained has very good fastness to wet and light.

We claim:

1. A 1:2-chromium complex dyestuff of the formula

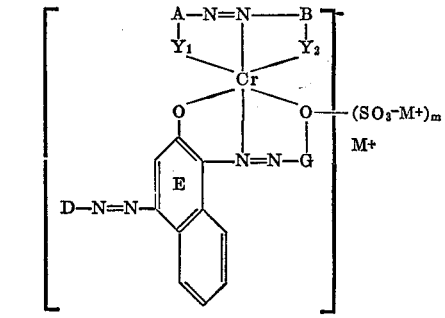

wherein

A represents o-phenylene or o-phenylene substituted by chlorine, bromine, fluorine, nitro, lower alkyl, lower alkoxy, lower-alkylsulfonyl and phenylsulfonyl; 1,2-naphthalene or nitro-1,2-naphthalene;

B represents 1,2-naphthylene or 1,2-naphthalene substituted by chlorine, bromine, lower alkyl, lower alkoxy, acetylamino, lower-alkoxycarbonylamino, sulfamoyl, lower-alkylsulfamoyl or N,N-di-lower-alkylsulfamoyl; 1-phenyl-3-methyl-5-pyrazolonyl-4, 1-chlorophenyl-3-methyl-5-pyrazolonyl-4, 1 - methoxyphenyl - 3-methyl-5-pyrazolonyl-4 or an acetoacetic acid anilide radical of the formula

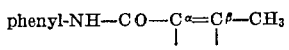

whereof $C^\alpha$ is linked to the adjacent azo bridge and $C^\beta$ is linked to $Y_2$;

D represents phenyl or phenyl substituted by chlorine, bromine, fluorine, lower alkyl, lower alkoxy and lower-alkylsulfonyl; naphthyl or naphthyl substituted by fluorine chlorine, bromine, lower alkyl or lower alkoxy;

—G—O— is a radical selected from the group consisting of
(a) a radical of the formula

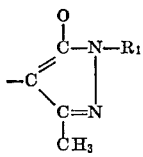

wherein $R_1$ represents hydrogen, lower alkyl, phenyl, chlorophenyl, bromophenyl, fluorophenyl, lower alkylphenyl, lower-alkoxyphenyl, naphthyl-1, methylsulfonyl or phenylsulfonyl;

(b) a radical of the formula

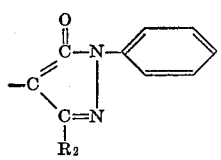

wherein $R_2$ represents carbamoyl, N-lower-alkylcarbamoyl or N,N-di-lower-alkylcarbamoyl;
(c) a radical of the formula

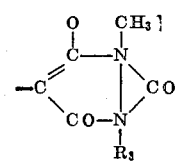

wherein $R_3$ represents phenyl, chlorophenyl or methylphenyl; and
(d) a radical of the formula

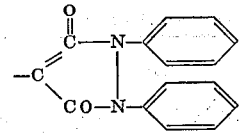

$Y_1$ represents —O— or —CO—O—, the carbon atom of the latter being linked to A, or

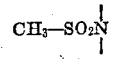

$Y_2$ represents —O—, —NH— or

wherein R represents methyl, ethyl, hydroxyethyl or phenyl,
$M^+$ represents a hydrogen or an alkali metal ion, and
$m$ represents one of the integers 1 and 2,
each of the groupings —$(SO_3^-M^+)$ being linked to a carbon atom of a carbocyclic aromatic ring of one or more of A, D, G and E.

2. A dyestuff as defined in claim 1 which is of the formula

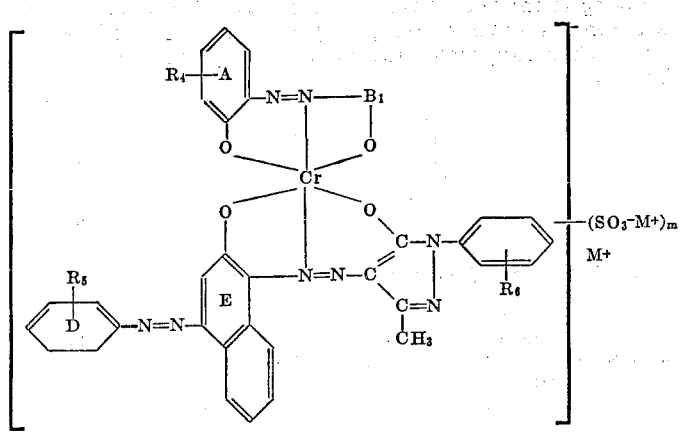

wherein
$B_1$ represents the divalent radical of the formula

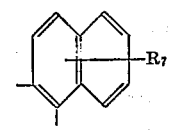

wherein $R_7$ is selected from any one to three members of the following: hydrogen, chlorine, bromine, lower alkyl and lower alkoxy;
$R_4$ is selected from any one to two members of the following: hydrogen, chlorine, bromine, fluorine, nitro and lower alkyl;
each of $R_5$ and $R_6$ is selected from one to two members of the following: hydrogen, chlorine, bromine, fluorine, lower alkyl and lower alkoxy;

$m$ represents a number ranging from 1 to 2, and $M^+$ represents a hydrogen ion or an alkali metal ion.

3. A dyestuff as defined in claim 2, wherein each of $R_4$ and $R_7$ is selected from the group consisting of hydrogen and chlorine, $R_5$ is selected from the group consisting of hydrogen, chlorine, lower alkyl and lower alkoxy, and $m$ represents one, the group —($SO_3^-M^+$) being linked to the 6-position of the naphthalene nucleus E.

4. A dyestuff as defined in claim 1 which is of the formula

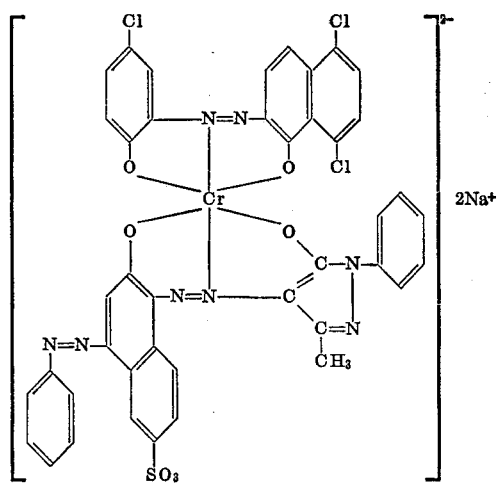

5. A dyestuff as defined in claim 1, which is of the formula

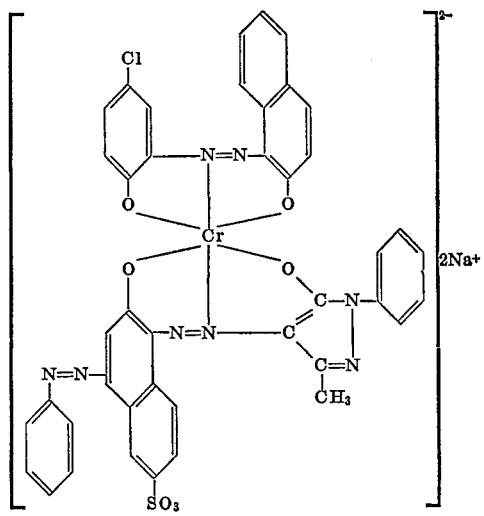

6. A dyestuff as defined in claim 1 which is of the formula

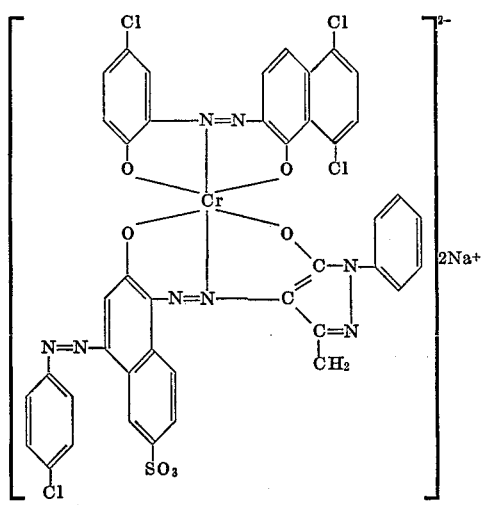

7. A dyestuff as defined in claim 1 which is of the formula

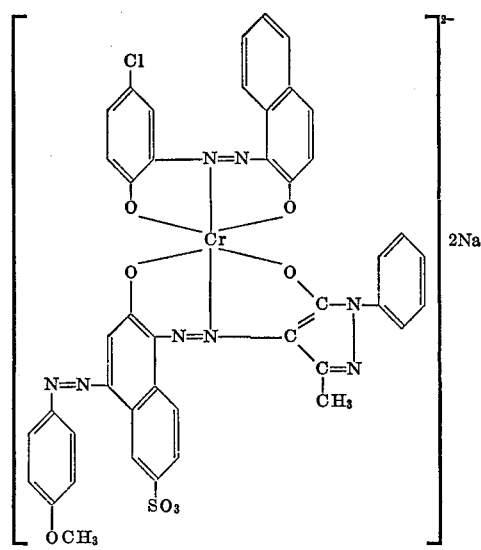

8. A dyestuff as defined in claim 1 which is of the formula

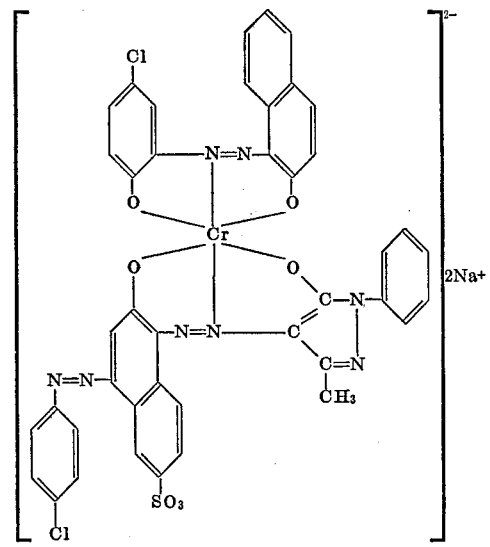

9. A dyestuff as defined in claim 1 which is of the formula

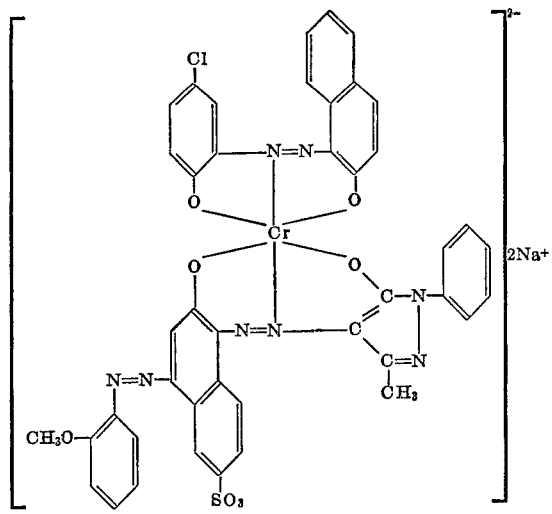

10. A dyestuff as defined in claim 1 which is of the formula

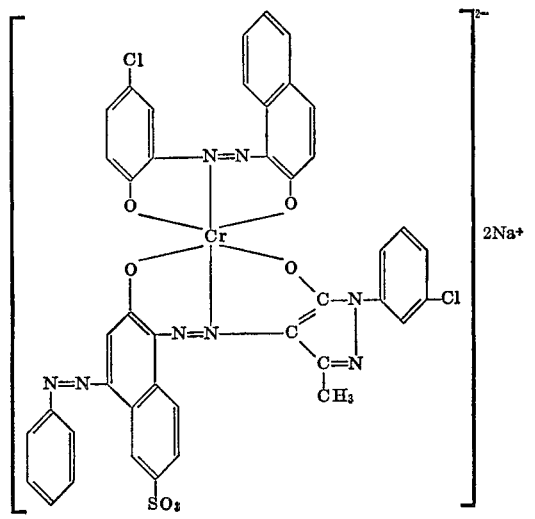

11. A dyestuff as defined in claim 1 which is of the formula

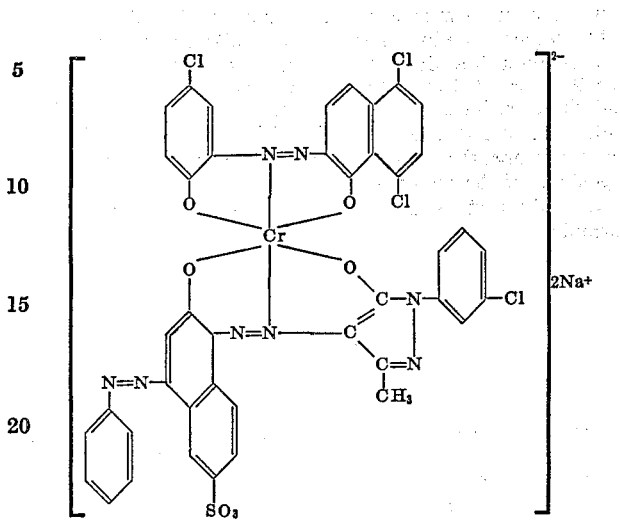

References Cited
UNITED STATES PATENTS

| | | | |
|---|---|---|---|
| 2,775,581 | 12/1956 | Neier et al. | 260—145 |
| 2,933,488 | 4/1960 | Biedermann et al. | 260—145 |
| 2,933,490 | 4/1960 | Biedermann et al. | 260—145 |
| 3,125,562 | 3/1964 | Ammann et al. | 260—145 XR |
| 3,398,132 | 8/1968 | Dehnert | 260—145 |
| 3,412,081 | 11/1968 | Ackermann | 260—145 |

FOREIGN PATENTS

| | | |
|---|---|---|
| 851,861 | 10/1960 | Great Britain. |
| 1,412,065 | 8/1965 | France. |

FLOYD D. HIGEL, Primary Examiner

U.S. Cl. X.R.

8—42, 43; 260—147, 148, 153, 154, 160, 162, 163, 196, 197, 199